United States Patent [19]

Arai

[11] Patent Number: 5,771,311
[45] Date of Patent: Jun. 23, 1998

[54] METHOD AND APPARATUS FOR CORRECTION OF COLOR SHIFTS DUE TO ILLUMINANT CHANGES

[75] Inventor: Yoshifumi Arai, Tokyo, Japan

[73] Assignee: Toyo Ink Manufacturing Co., Ltd., Tokyo, Japan

[21] Appl. No.: 579,549

[22] Filed: Dec. 27, 1995

[30] Foreign Application Priority Data

May 17, 1995 [JP] Japan ..................................... 7-118791

[51] Int. Cl.[6] ....................................................... G06K 9/00
[52] U.S. Cl. ......................... 382/162; 382/191; 382/156; 382/158; 382/167; 358/518
[58] Field of Search ..................................... 382/156, 157, 382/158, 162, 167, 191, 274; 358/518, 523; 364/526

[56] References Cited

U.S. PATENT DOCUMENTS

| | | | |
|---|---|---|---|
| 5,109,275 | 4/1992 | Naka et al. | 358/518 |
| 5,506,696 | 4/1996 | Nakano | 358/518 |

*Primary Examiner*—Leo Boudreau
*Assistant Examiner*—Phuoc Tran
*Attorney, Agent, or Firm*—Knobbe, Martens, Olson & Bear, LLP

[57] ABSTRACT

Color separation values such as CMYK values from an input device are transformed into characteristic parameter values by a first transforming device having a neural network which has undergone learning in advance in such a manner as to output characteristic parameter values obtained by multivariate analysis of spectral distributions which correspond to the color separation values and are illuminant-independent. These characteristic parameter values are subjected to a linear transformation by a second transforming device, the linear transformation having a constraint that calorimetric values under a specified illuminant are to be equal or another similar constraint, by using mean vectors and eigenvectors (principal component vectors) of predetermined spectral reflectances stored in a storage device. The transformed characteristic parameter values are transformed into color separation values of a target color reproduction device by a third transforming device having a neural network which has undergone learning in advance.

15 Claims, 7 Drawing Sheets

METHOD AND APPARATUS FOR CORRECTION OF COLOR SHIFTS DUE TO ILLUMINANT CHANGES

BACKGROUND OF THE INVENTION

1. Field of the Invention

The present invention relates to a device-independent color reproduction method and apparatus for such as color DTP. More particularly, the present invention concerns a color reproduction method and apparatus which make it possible to effect color matching such that not only a device-independent color but also a color reproduced by any color reproduction device always appears to be the same as the color of an original without being dependent on an illuminant, by using characteristic parameters which are obtained by the multivariate analysis of spectral reflectances which are always capable of accurately representing the physical properties of the color independent of the kind of illuminant as a device-independent color representation process.

2. Description of the Related Art

Conventionally, a so-called device-independent color reproduction method is known as a method of color reproduction in which the reproduced color is not dependent on a color reproduction device and which is capable of reproducing the same color as that of an original even if the color is reproduced by any color reproduction device. In this device-independent color reproduction method, color information is temporarily transformed into color representations which are not dependent on the color reproduction device (intermediate representation method), and color correction is subsequently carried out.

In the above-described reproduction method, the same color as that of an original is always reproduced with sufficient accuracy without being dependent on the color reproduction device, by using calorimetric values, such as CIE XYZ values, uniform color space CIE L*a*b*, or the like prescribed by CIE (Commission Internationale de l'Eclairage), and by effecting transformations between the calorimetric values and color separation values, such as CMYK values, which serve as color information values.

However, since the CIE L*a*b* values and the CIE XYZ values are defined by the spectral distributions of illuminants, spectral reflectances of the subject surfaces, and color matching functions, the conventional device-independent color reproduction method has a problem in that the reproduced color does not match the color of the original unless the illuminant used for viewing the color of the original is the same illuminant which is used in the calculation of the CIE L*a*b* values.

Hence, the conventional device-independent color reproduction method has the problem that since the illuminants allowing the reproduced color to appear to be the same color as the original are restricted by predetermined illuminants, color matching cannot be accomplished only under very limited environments (lighting conditions).

Generally, there are various types of illumination used for viewing colors, including illumination under an incandescent lamp, illumination under a fluorescent lamp, sunlight, and so on. Therefore, the conventional device-independent color reproduction method disadvantageously makes it difficult to allow the reproduced color to always match the color of the original under such various illuminants.

SUMMARY OF THE INVENTION

Accordingly, the present invention has been devised to overcome the above-described problems, and its object is to provide a highly reliable color reproduction method and apparatus which make it possible to ensure that the appearance of a reproduced color matches the appearance of the color of an original to be reproduced, independent of the illuminant used for viewing the color.

To attain the above object, in accordance with a first aspect of the present invention, there is provided a color reproduction method for effecting color matching for a plurality of different color reproduction devices for reproducing the color of an original color image, comprising the steps of: setting an intermediate color representation system which is represented by at least three characteristic parameter values obtained by multivariate analysis of a spectral reflectance or a spectral transmittance which is illuminant-independent; learning a first neural network such that, when at least three color information values peculiar to each the color reproduction devices are inputted, the at least three characteristic parameter values of the intermediate color representation system corresponding to the inputted color information values are outputted, and learning a second neural network such that, when the at least three characteristic parameter values of the intermediate color representation system are inputted, color information values corresponding to the inputted characteristic parameter values are outputted; transforming the at least three color information values peculiar to a first color reproduction device into the at least three characteristic parameter values of the intermediate color representation system by using the first neural network which has been learned; transforming the at least three transformed parameter values under a constraint concerning colorimetric values of colors reproduced by the first color reproduction device and a second color reproduction device different therefrom, by using eigenvectors and a mean vector of the spectral reflectance or the spectral transmittance which are obtained by the multivariate analysis; and transforming into color information values of the second color reproduction device the at least three characteristic parameter values transformed by using the second neural network which has been learned, so as to effect color matching for the plurality of different color reproduction devices.

In accordance with a second aspect of the present invention, in the color reproduction method according to the first aspect of the invention, the at least three color information values are values for representing predetermined three primary colors based on additive mixture using such as R, G, B values.

In accordance with a third aspect of the present invention, in the color reproduction method according to the first aspect of the invention, the at least three color information values are values for representing each of predetermined colors based on subtractive mixture using such as C, M, Y or C, M, Y, K values.

In accordance with a fourth aspect of the present invention, in the color reproduction method according to the first aspect of the invention, principal component analysis is used as the multivariate analysis, and a color system which is represented by principal component values of the spectral reflectance obtained by the principal component analysis is used as the intermediate color representation system.

In accordance with a fifth aspect of the present invention, in the color reproduction method according to the first aspect of the invention, each of the neural networks is a multilayered feedforward neural network with three to five layers having a learning function.

In accordance with a sixth aspect of the present invention, in the color reproduction method according to the first aspect of the invention, the constraint has a condition that calorimetric values of a subject and those of a reproduced color under a designated illuminant are equal, or that a mean color difference value between a subject color and a reproduced color measured under the plurality of illuminants is minimized.

In accordance with a seventh aspect of the present invention, in the color reproduction method according to any one of the first to sixth aspects of the invention, any one of an illuminant A, an illuminant B, an illuminant C, an illuminant D, and illuminants F1 to F12 which are specified by CIE (Commission Internationale de l'Eclairage) or an illuminant having a spectral distribution equivalent thereto is used as the illuminant used in the transformation into the color information values for the second color reproduction device.

In accordance with an eighth aspect of the present invention, there is provided a color imaging apparatus for effecting color matching for a plurality of different color reproduction devices for reproducing the color of an original color image, the color imaging apparatus comprising: input means for converting at least three color information values into electrical signals; storage means for storing eigenvectors and mean vectors of spectral reflectances of reproduced colors by a first color reproduction device and a second color reproduction device which are obtained by performing the multivariate analysis of spectral reflectances in advance, connection weights of two neural networks which have been learned in advance, and a spectral distribution of at least one illuminant; first transforming means constituted by a multilayered feedforward neural network with a learning function which has learned the transformation of the at least three color information values into principal components of a spectral reflectance of a reproduced color corresponding to a set of color separation values of the at least three color information values, the first transforming means being adapted to transform the electrical signals from the input means into electrical signals corresponding to characteristic parameter values obtained by the multivariate analysis of spectral reflectances or spectral transmittances of the reproduced color corresponding to the at least three color information values; second transforming means for transforming the electrical signals from the first transforming means by a linear transformation having a condition that calorimetric values of a subject and those of a reproduced color under a designated illuminant are equal, or that a mean color difference value between a subject color and a reproduced color measured under the plurality of illuminants is minimized, by using the eigenvectors and mean vectors of the spectral reflectances of the reproduced colors by the first color reproduction device and the second color reproduction device which are stored in advance in the storage means; third transforming means constituted by a multilayered feedforward neural network with a learning function which has learned the transformation of principal components of a spectral reflectance of a reproduced color into color information values, the third transforming means being adapted to transform characteristic parameter values of the second color reproduction device outputted from the second transforming means into electrical signals corresponding to color information values of the second color reproduction device; and output means for outputting as output signals the electrical signals outputted from the third transforming means.

In accordance with the first aspect of the present invention, a color system which is represented by at least three characteristic parameter values obtained by multivariate analysis of a spectral reflectance or a spectral transmittance which is illuminant-independent is set as an intermediate color representation system. Each color reproduction device has at least three peculiar color information values, and the first neural network is learned such that, when these color information values are inputted, at least three characteristic parameter values of the intermediate color representation system corresponding to the inputted color information values are outputted. Also, the second neural network is learned such that, when the at least three characteristic parameter values of the intermediate color representation system are inputted, color information values corresponding to the inputted characteristic parameter values are outputted.

Color separation values may be used as the color information values. For instance, the color information values may be values for representing predetermined three primary colors based on additive mixture, such as R, G, and B values making up a color image, as in the second aspect of the present invention, or may be values for representing each of predetermined colors based on subtractive mixture, such as C, M, Y, or C, M, Y, K values making up a color image, as in the third aspect of the present invention.

As in the fourth aspect of the present invention, principal component analysis may be used as the multivariate analysis, and a color system which is represented by principal component values of the at least three spectral reflectances obtained by the principal component analysis may be used as the intermediate color representation system.

As in the fifth aspect of the present invention, each of the neural networks may be constituted by a multilayered feedforward neural network with three to five layers having a learning function.

The at least three color information values peculiar to the first color reproduction device are transformed into at least three characteristic parameter values of the intermediate color representation system by using the first neural network which has been learned as described above. These transformed characteristic parameter values are linearly transformed under a constraint concerning the calorimetric values of the colors reproduced by the first color reproduction device and the second color reproduction device different therefrom, by using eigenvectors and a mean vector of the spectral reflectance or the spectral transmittance which are obtained by the multivariate analysis. The linearly transformed characteristic parameter values are transformed into color information values of the second color reproduction device by using the second neural network which has been learned. Color matching is carried out for different color reproduction devices by means of such color transformations.

As the constraint, as in the sixth aspect of the present invention, it is possible to use the condition that calorimetric values of a subject and those of a reproduced color under a designated illuminant are equal, or that a mean color difference value between a subject color and a reproduced color measured under the plurality of illuminants is minimized. In addition, as the illuminant used in the linear transformation, as in the seventh aspect of the present invention, it is possible to use any one of the illuminant A, the illuminant B, the illuminant C, the illuminant D, and the illuminants F1 to F12 which are specified by CIE (Commission Internationale de l'Eclairage) or an illuminant having a spectral distribution equivalent thereto.

Therefore, in accordance with the present invention, by using characteristic parameter values which are illuminant-independent, and by making effective use of the learning function of neural networks, even in cases where the color is represented by CMYK values or RGB values, it is possible to realize with sufficient accuracy the transformation between the color separation values concerning such colors and characteristic parameters representing spectral reflectances.

In addition, since the neural networks having learning functions are used in the transformation between the color separation values, such as the CMY and/or CMYK values and RGB values, and the characteristic parameter values, even in cases where unknown data which were not used in learning are inputted, the neural networks which have undergone sufficient learning are capable of obtaining optimum outputs with respect to input data by virtue of their generalization abilities.

Further, since the spectral reflectance data are compressed with high efficiency by the use of the principal component analysis as the multivariate analysis, the amount of data can be extremely small as compared to a case where spectral reflectances are used as they are, so that the time required for transformation can be reduced.

Still further, it becomes possible to realize highly reliable color matching which is dependent on neither the device nor the illuminant by means of the linear transformation having the condition that calorimetric values of a subject and those of a reproduced color under a designated illuminant are equal, or that a mean color difference value between a subject color and a reproduced color measured under the plurality of illuminants is minimized. Accordingly, by using characteristic parameters determined by the principal component analysis of spectral reflectances as an intermediate representation of the color in the same way as CIE L*a*b* values and CIE XYZ values, it becomes possible to realize a color reproducing method which is not only device-independent but also illuminant-independent.

The above-described color reproduction method can be realized by the color imaging apparatus according to the eighth aspect of the invention for effecting color matching for a plurality of different color reproduction devices for reproducing the color of an original color image, the color imaging apparatus comprising: input means for converting at least three color information values into electrical signals; storage means for storing eigenvectors and mean vectors of spectral reflectances of reproduced colors by a first color reproduction device and a second color reproduction device which are obtained by performing the multivariate analysis of spectral reflectances in advance, connection weights of two neural networks which have been learned in advance, and a spectral distribution of at least one illuminant; first transforming means constituted by a multilayered feedforward neural network with a learning function which has learned the transformation of the at least three color information values into principal components of a spectral reflectance of a reproduced color corresponding to a set of color separation values of the at least three color information values, the first transforming means being adapted to transform the electrical signals from the input means into electrical signals corresponding to characteristic parameter values obtained by the multivariate analysis of spectral reflectances or spectral transmittances of the reproduced color corresponding to the at least three color information values; second transforming means for transforming the electrical signals from the first transforming means by a linear transformation having a condition that calorimetric values of a subject and those of a reproduced color under a designated illuminant are equal, or that a mean color difference value between a subject color and a reproduced color measured under the plurality of illuminants is minimized, by using the eigenvectors and mean vectors of the spectral reflectances of the reproduced colors by the first color reproduction device and the second color reproduction device which are stored in advance in the storage means; third transforming means constituted by a multilayered feedforward neural network with a learning function which has learned the transformation of principal components of a spectral reflectance of a reproduced color into color information values, the third transforming means being adapted to transform characteristic parameter values of the second color reproduction device outputted from the second transforming means into electrical signals corresponding to color information values of the second color reproduction device; and output means for outputting as output signals the electrical signals outputted from the third transforming means.

DESCRIPTION OF THE PREFERRED EMBODIMENTS

It is conventionally known that the spectral reflectances can be highly accurately approximated with a small number of characteristic parameters if eigenvectors obtained by the principal component analysis of the spectral reflectances are used, and many studies in this field have been reported. In particular, among models describing the color constancy phenomenon in the color perception by primates and mammalians such as humans and monkeys, in color constancy models for simultaneously estimating the spectral reflectance of an object surface and the spectral distribution of an illuminant from the response value of three kinds of cone, which are kinds of optical sensors, the assumption is used that the spectral reflectances of colors existing in the natural world can be sufficiently accurately approximated by a relatively small number of characteristic parameters. Because the color constancy models can estimate the spectral reflectances with sufficient accuracy, the above-described assumption is accepted today as being valid.

In the present invention, in the field of color reproduction, the above-described fact is actually applied to the intermediate color representation system of colors in device- and illuminant-independent color imaging, so as to realize the estimation of spectral reflectances of a specified and reproduced color and realize a color image which is not dependent on an illuminant.

Namely, in the present invention, mutual transformations are carried out between, on the one hand, a set of color separation values serving as a set of color information values, such as CMY and/or CMYK values, or RGB values, and, on the other hand, characteristic parameter values obtained by a technique of multivariate analysis of spectral reflectances or spectral transmittances of the reproduced color. That is, the output values of a neural network, which has completed the learning of transformation from the color separation values of a subject color reproduction device into characteristic parameters, are transformed into characteristic parameters of a target color reproduction device by a linear transformation technique using the mean vectors and eigenvectors of spectral reflectances determined in advance, and the characteristic parameters are then transformed into color separation values of the target color reproduction device by using another neural network.

Hereafter, a detailed description will be given of an embodiment of the present invention with reference to the accompanying drawings.

Figure 1:
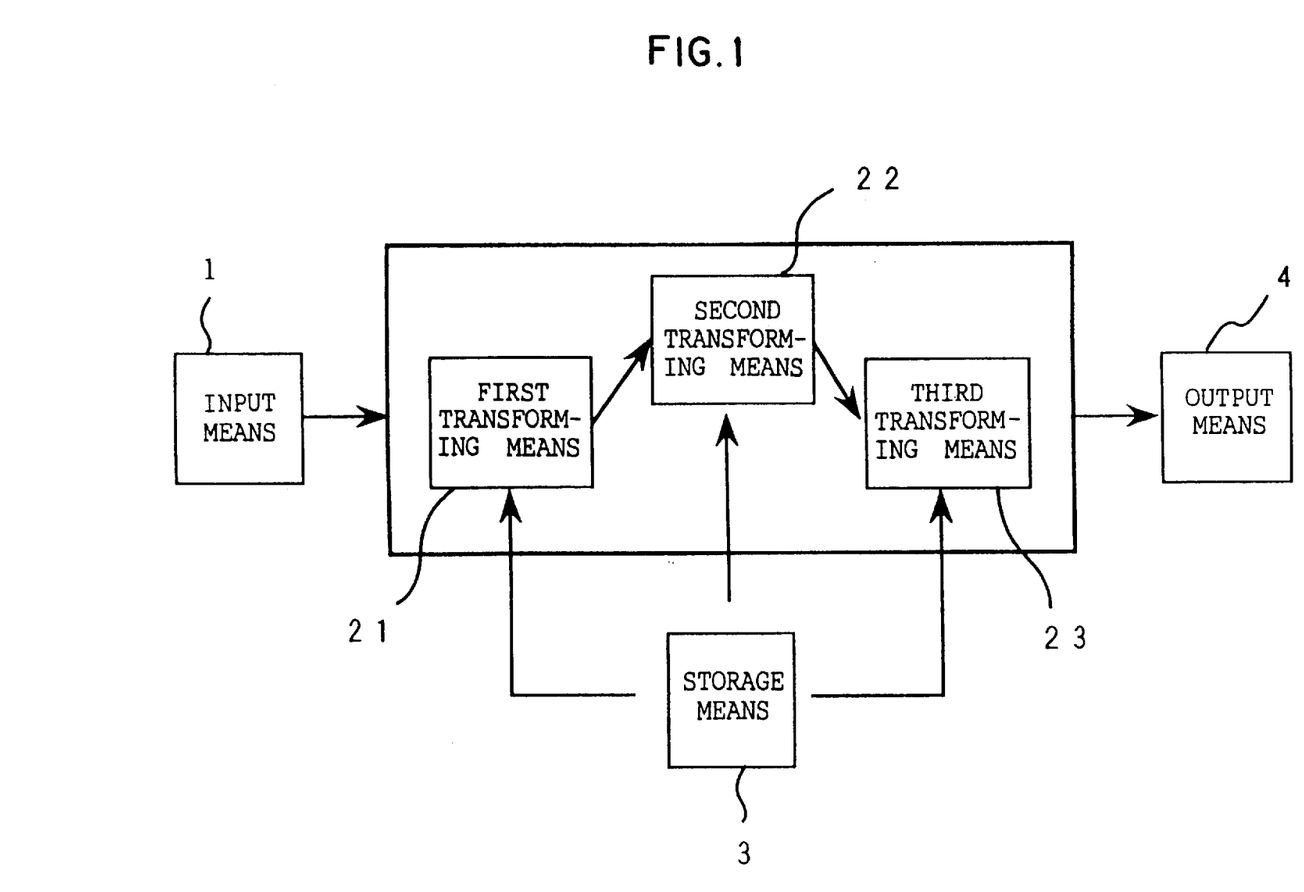
FIG. 1 is a block diagram illustrating a schematic configuration of a color imaging apparatus using characteristic parameters which are illuminant-independent in accordance with an embodiment of the present invention.

FIG. 1 is a schematic diagram of a color imaging apparatus wherein mutual transformations are carried out between, on the one hand, a set of color separation values, such as CMY and/or CMYK values, or RGB values, and, on the other hand, characteristic parameter values obtained by the technique of multivariate analysis of spectral reflectances or spectral transmittances of the reproduced color. The output values of a neural network, which has completed the learning of transformation from the color separation values of a subject color reproduction device into characteristic parameters, are transformed into characteristic parameters of a target color reproduction device by a linear transformation technique using the mean vectors and eigenvectors of spectral reflectances determined in advance, and the characteristic parameters are then transformed into color separation values of the target color reproduction device by using another neural network.

As shown in the drawing, this color imaging apparatus is comprised of an input means 1; a transforming device including a first transforming means 21, a second transforming means 22, and a third transforming means 23; a storage device 3; and an output means 4.

It should be noted that the first transforming means 21 and the third transforming means 23 are respectively provided with transforming functions, which will be described later, and learning functions for learning them. In addition, the second transforming means 22 is provided with a linear transforming function having the condition that calorimetric values of the subject and those of a reproduced color under a designated illuminant are equal, or that a mean color difference value between a subject color and a reproduced color measured under the plurality of illuminants is minimized.

The input means 1 in FIG. 1 transforms a set of color information values, i.e., a combination of sets of color separation values, into electrical signals corresponding thereto.

The first transforming means 21 transforms the electrical signals from the input means 1 into characteristic parameters obtained by multivariate analysis of spectral reflectances. The first transforming means 21 is constituted by a neural network, and has a transforming function, which will be described later, as well as a learning function for learning the same.

Figure 2:
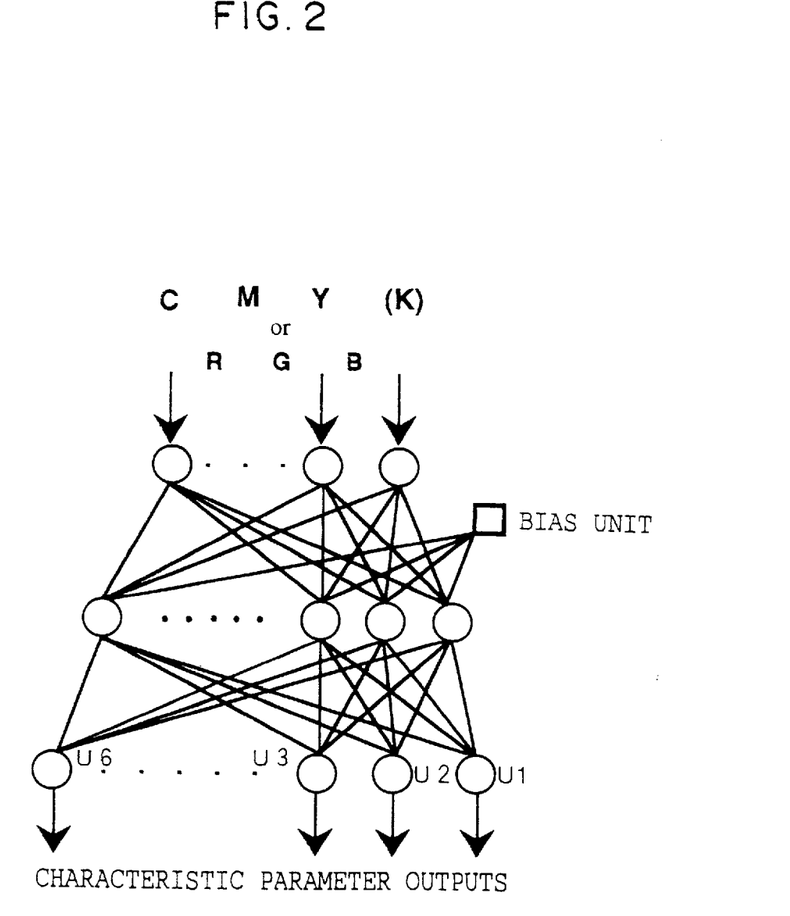
FIG. 2 is a schematic diagram illustrating an example of the configuration of a multilayered feedforward neural network which is used in a first transforming means in FIG. 1.

As shown in FIG. 2 by way of example, the neural network used as the first transforming means 21 is comprised of an input layer having three or four units, an intermediate layer having a multiplicity of units, and an output layer having three to six units U1, U2, . . . , Un. The units of the hidden and output layer are connected to a bias unit.

The units of the intermediate layer are constituted by neural circuit elements in which input and output relationships are expressed by a sigmoid function, while the units of the input and output layers are constituted by neural circuit elements in which input and output relationships are linear. The units of the output layer may also be constituted by neural circuit elements in which input and output relationships are described by a sigmoid function, in the same way as the units of the intermediate layer. The number of output units of the output layer corresponds to the number of characteristic parameters used for actually representing the spectral reflectances among the characteristic parameters which are obtained by multivariate analysis of spectral reflectances, and three is normally preferable.

The second transforming means 22 in FIG. 1 subjects an output from the first transforming means 21, i.e., characteristic parameters, to linear transformation by using eigenvectors obtained by multivariate analysis of the spectral reflectances as well as mean vectors of spectral reflectances, into characteristic parameters of the target color reproduction device such that calorimetric values of the subject and those of a reproduced color under a designated illuminant are to be equal, or such that a mean color difference value between a subject color and a reproduced color which is measured under the plurality of illuminants is minimized.

Figure 3:
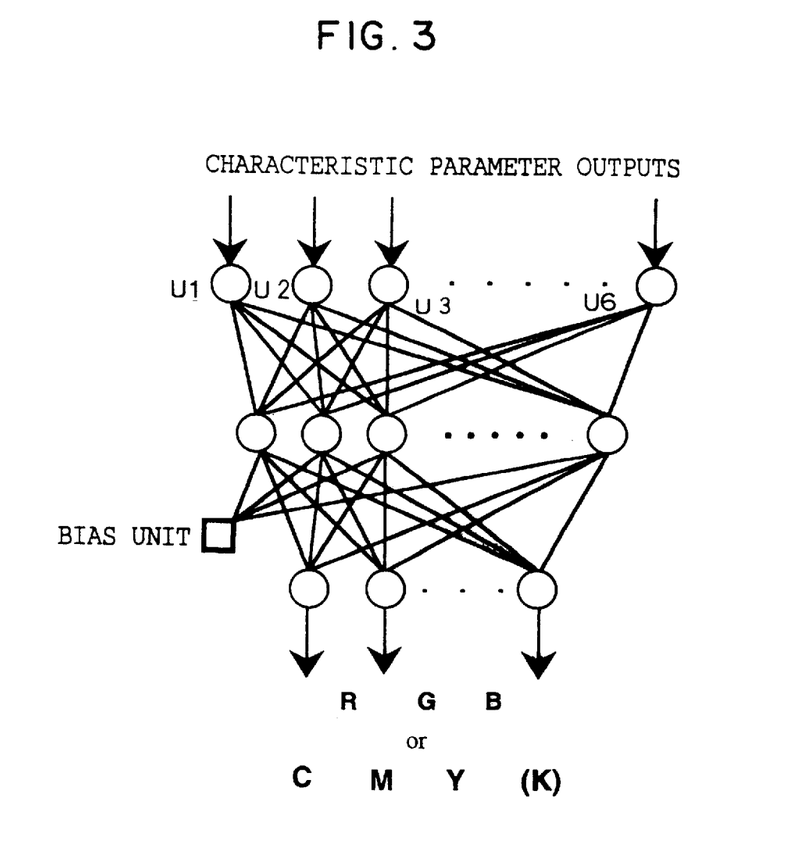
FIG. 3 is a schematic diagram illustrating an example of the configuration of a multilayered feedforward neural network which is used in a second transforming means in FIG. 1.

The third transforming means 23 transforms the electrical signals from the second transforming means 22, i.e., characteristic parameters, into color separation values of the target color reproduction device. The third transforming means 23 is constituted by a neural network, and has a transforming function, which will be described later, as well as a learning function for learning the same. As an example of the neural network used as the third transforming means 23, as shown in FIG. 3, the neural network is comprised of an input layer having three to six input units I1, I2, . . . , In in a number corresponding to the number of the output units of the neural network in the first transforming means 21, a hidden and output layer having a multiplicity of units, and an output layer having three or four output units. The units of the hidden and output layer are connected to a bias unit. Incidentally, it is not particularly necessary for the bias unit to be connected to the units of the intermediate layer.

In the same way as the above-described first transforming means 21, the units of the intermediate layer are preferably constituted by neural circuit elements in which input and output relationships are expressed by sigmoid functions, while the units of the input and output layers are preferably constituted by neural circuit elements in which input and output relationships are linear. The units of the output layer may also be constituted by neural circuit elements in which input and output relationships are described by a sigmoid function, in the same way as the units of the intermediate layer.

Meanwhile, the storage device 3 in FIG. 1 is for storing the eigenvectors, which are determined in advance by performing multivariate analysis of spectral reflectances of respective colors reproduced by the subject color reproduction device (a first color reproduction device) and the target color reproduction device (a second color reproduction device), mean vectors of the spectral reflectances, and connection weights of the two neural networks which have completed learning, as well as the spectral distribution of the illuminant used for calculating calorimetric values, and color matching functions.

In addition, the output means 4 transmits outputs from the third transforming means 23 as arbitrary output signals, such as electrical signals or optical signals, which match inputs to the device (the color reproduction device).

Next, a description will be given of the operation of the color imaging apparatus in accordance with this embodiment which is arranged as described above.

In FIG. 1, the input means 1 converts a set of at least three color information values concerning the color into electrical signals corresponding thereto. Namely, output values from the device, such as CMY and/or CMYK values, or RGB values, of an original color printed by a color reproduction device to be subjected to transformation in the set of color information are supplied as data, and are outputted as arbitrary signals such as electrical signals.

Next, the signals outputted from the input means 1 are inputted to the first transforming means 21. In the first transforming means 21, when the output values from the device, such as CMY and/or CMYK values, or RGB values, are supplied thereto as its input, an output $H_i$ is outputted from each unit of the hidden layer of the neural network having a structure such as the one shown in FIG. 2, in accordance with the following Formula (1):

$$H_i = f(net_i) \quad (1)$$
$$net = \sum_{i=j}^{m} \sum_{j=1}^{n} (W^{(h)})_{ij} I_j + b_i$$

where $W^{(h)}_{ij}$ represents a coefficient of connection between a j-th input unit of the input layer and an i-th unit of the intermediate layer, i.e., a weight; $I_j$ represents an output of the j-th unit of the input layer; and $b_i$ represents a bias value supplied from the bias unit. Also, an output $O_i$ of the unit of the output layer is similarly expressed as shown in the following Formula (2):

$$O_i = f(net_i) \quad (2)$$
$$net = \sum_{i=j}^{m} \sum_{j=1}^{n} (W^{(o)})_{ij} H_j + b_i$$

where $W^{(o)}_{ij}$ represents a coefficient of connection between the j-th unit of the intermediate layer and the i-th unit of the output layer; and $H_j$ is the output value of the j-th unit of the intermediate layer defined by Formula (1). In addition, n, m, and k are the respective numbers of units of the input layer, the intermediate layer, and the output layer.

At this time, the characteristic of each unit of the input layer is one in which the input is outputted as it is. Meanwhile, the coefficient of connection of each unit of the intermediate layer has a characteristic which is expressed by a sigmoid function that increases monotonously in a section [0, 1] defined by the following Formula (3):

$$f(x) = 1/(1+e^{-x}) \quad (3)$$

Meanwhile, the unit of the output layer has a characteristic which is expressed by a sigmoid function or a linear function. However, the unit of the output layer may have an input from the bias unit.

The connection weights of this neural network are learned and corrected in advance in such a manner as to minimize a square error between the output of each unit of the output layer and a teaching signal, i.e., a characteristic parameter determined by the principal component analysis of the spectral reflectances. The back propagation learning rule proposed by Rumelhert is used in this learning, and the transformation from CMY and/or CMYK values, or RGB values or the like into characteristic parameters obtained by the principal component analysis of the spectral reflectances is learned.

Here, an eigenvector determined by the principal component analysis is defined as a solution of a eigenvalue problem defined by the following Formulae (4) by using a covariance matrix of spectral reflectances of various colors.

$$\Phi \mu^i = \lambda_i \mu^i$$
$$(\mu^i)^t \mu^i = 1 \quad (4)$$

where $i=1, 2, \ldots, r$ (r: dimension of data); $\Phi$ represents a covariance matrix defined by Formula (5) shown below; $\lambda_i$ represents an i-th eigenvalue; $\mu^i$ represents an i-th eigenvector; and t represents transposition.

$$\Phi = E[\hat{R}^t \hat{R}] \quad (5)$$

where the matrix $\hat{R}$ is one in which a mean vector ER of the spectral reflectance is subtracted from the matrix R having the spectral reflectances as its components.

$$\hat{R} = R - ER$$

ER: mean vector of spectral reflectances (one in which all the spectral reflectance distributions of various colors are averaged)

E[ ]: mean of the values within the bracket [ ]

In addition, characteristic parameters $Y_i$, i.e., principal components, are calculated by the following formula by using the eigenvectors $\mu^i$ obtained from Formula (4):

$$Y_i = <(\mu^i)^t \hat{R}> \quad (6)$$

where < > represents an inner product.

As described above, the signals transformed by the neural network which completed learning in the first transforming means 21 are introduced into the second transforming means 22, and are transformed into characteristic parameters of the target color reproduction device in accordance with the formula below, such that calorimetric values of the subject and those of a reproduced color under a designated illuminant are to be equal, or such that a mean color difference value between a subject color and a reproduced color which is measured under the plurality of illuminants is minimized.

$$Y' = (ML\mu')^{-1}[C_1 - MLm'] \quad (7)$$

where M: color matching functions

L: vector representing a spectral distribution of an illuminant m': mean vector of spectral reflectances of the reproduced color of the target color reproduction device $\mu'$: principal component vector (eigenvector) with respect to the reproduced color of the target color reproduction device Y': principal component matrix of the target color reproduction device $C_1$: matrix of XYZ values of the subject color reproduction device That is, the respective color information values, such as calorimetric values, at a time when the spectral reflectances of two devices are represented by parameters can be expressed as shown in the following formula:

$$C_1 = ML\mu Y + MLm$$

$$C_2 = ML\mu' Y' + MLm'$$

If it is assumed that these calorimetric values agree with each other (i.e., $C_1 = C_2$), $$Cl = ML\mu' Y' + MLm'$$

Hence, the aforementioned Formula (7) can be derived from $C_1 - MLm' = ML\mu' Y'$.

The characteristic parameters obtained by transformation are transmitted to the third transforming means 23. Upon receiving outputs from the second transforming means 22, i.e., characteristic parameters, in the same way as the first transforming means 21, the third transforming means 23 calculates outputs of the intermediate layer and the output layer of the neural network having a structure such as the one shown in FIG. 3 in accordance with Formulae (1) and (2).

The connection weights of this neural network are learned and modified in advance in such a manner as to minimize a mean square error between the output of each unit of the output layer and a teaching color separation value. In the same way as described above, the back propagation learning rule proposed by Rumelhert is used in this learning, and the transformation from characteristic parameters obtained by the principal component analysis of spectral reflectances into CMY and/or CMYK values, or RGB values or the like is learned.

The set of color separation values obtained by transformation are sent to the output means 4, and are transformed into arbitrary signals such as electrical signals or optical signals.

Next, a description will be given of a preferred embodiment in which CMY values for a thermal transfer-type proofing printer as a subject color reproduction device and a dye-sublimation printer as a target color reproduction device are used. In this embodiment, one of the illuminant D50, the illuminant A, and the illuminant D75, which are specified by CIE, is used as the illuminant, and a description will be given by using the spectral distributions of these three kinds of illuminants.

First, the respective spectral reflectances of 1331 ($11^3$) color chips, which are obtained by combinations of CMY values and color-reproduced by using the color reproduction devices used in this embodiment at density intervals of 10% from 0 to 100%, are photometrically measured by a spectrophotometer. Since the spectral reflectances are independent of an illuminant, the physical characteristics of colors can always be represented accurately independent of the types of illuminant. Next, the mean vector ER of the total spectral reflectances, as well as data in which this mean vector ER is subtracted from the spectral reflectance R of each color, are determined, and the covariance matrix $\Phi$ is calculated by using Formula (5) above.

Figure 4:
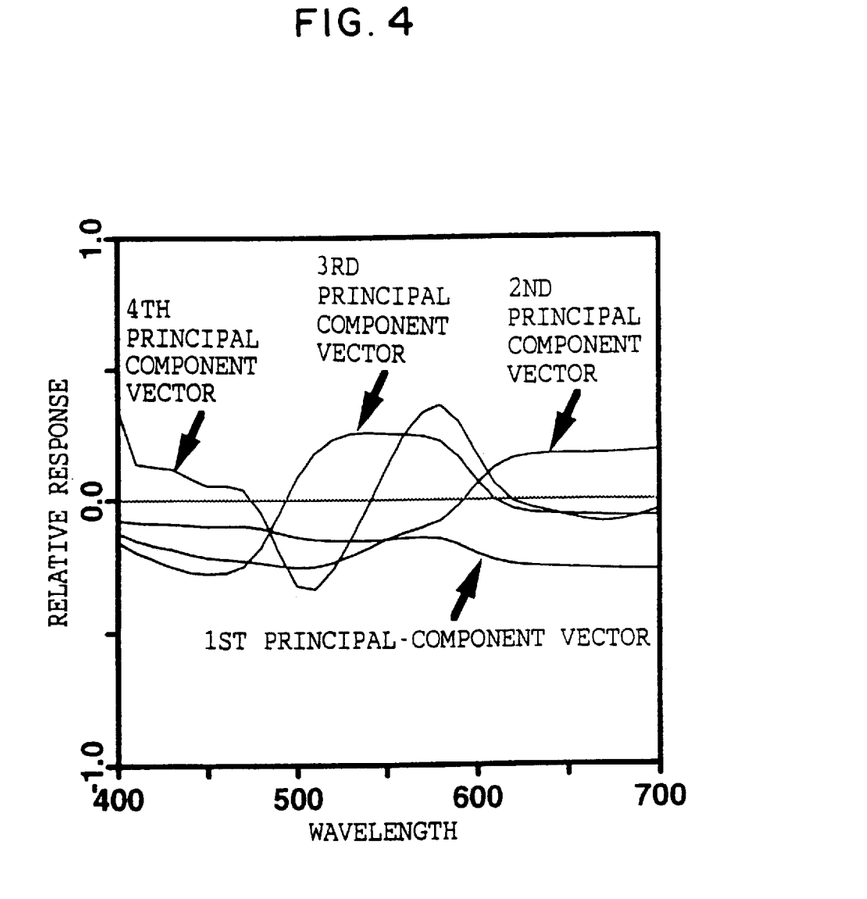
FIG. 4 is a diagram illustrating eigenvectors (principal component vectors) of the spectral reflectance of a color reproduced by a proofing printer, which are calculated for this embodiment by principal component analysis.

Then, the equation of the eigenvalue problem in Formula (4) above is solved to perform principal component analysis. From the results of the principal component analysis, eigenvectors (principal component vectors) such as those shown in FIG. 4 are obtained. However, FIG. 4 shows the case of the thermal transfer-type proofing printer, and first to fourth principal component vectors are shown.

The eigenvectors of the respective printers and the mean vectors of the spectral reflectances derived as described above are stored in advance in the storage device 3, and are used in performing the linear transformation of the characteristic parameters by the second transforming means 22.

Next, the characteristic parameters $Y_i$ for representing the spectral reflectances are calculated in accordance with Formula (6) above by using the eigenvectors $\mu^i$ of the spectral reflectances of the colors reproduced by the respective color reproduction devices, which were obtained by the above-described principal component analysis.

These values are used at the time of learning the two neural networks for effecting transformation between the CMY values and characteristic parameters, and the connection weights for the neural networks after learning are stored in the storage device 3. That is, learning is effected such that each set of CMY values is transformed into a set of characteristic parameters by using teaching signals of the characteristic parameters determined by the principal component analysis of the spectral reflectances, the connection weights of the respective units are calculated, and the connection weights are stored in the storage device 3.

Figure 5:
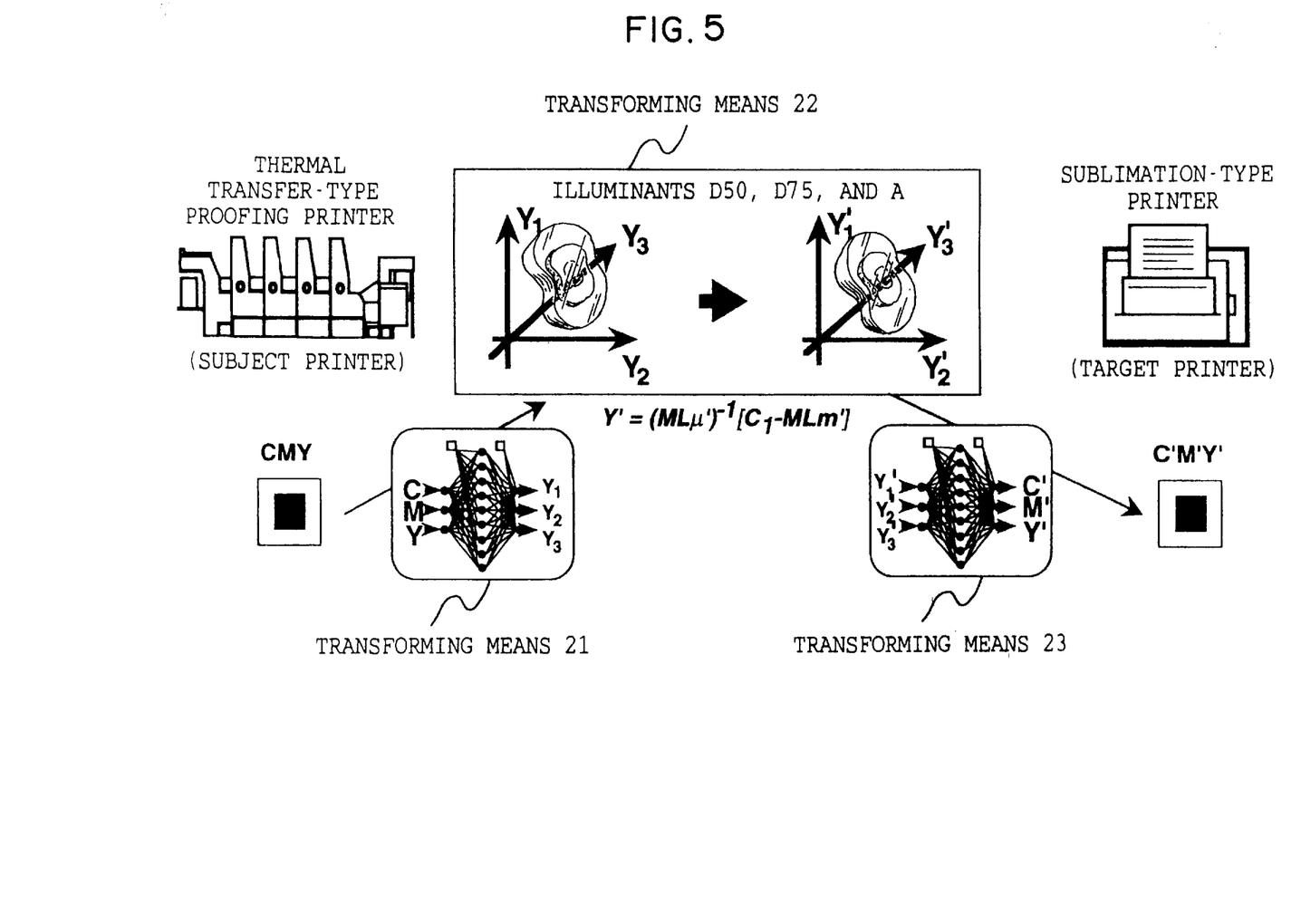
FIG. 5 is a conceptual diagram illustrating processing steps of the color imaging apparatus using characteristic parameters which are illuminant-independent in accordance with this embodiment.

The CMY values which are actually inputted are transformed into spectral reflectances by using the results thus obtained. The inputted CMY values for each color are transmitted to the first converting means 21, and are transformed into the characteristic parameters by using the neural network which has undergone learning in advance. Then, the determined characteristic parameters are transmitted to the second transforming means 22 so as to be transformed into characteristic parameters representing the spectral reflectance of the dye-sublimation printer by using the eigenvectors, the mean vector, the spectral distribution of the illuminant, and the color matching functions which are stored in the storage means 3. As for the illuminant used at this time, it is possible to use the illuminant for viewing the reproduced color or the illuminant used in this embodiment, and to make the calorimetric value of the reproduced color be equal to the calorimetric value of the subject color under that illuminant. FIG. 5 is a schematic diagram of this processing.

Figure 6:
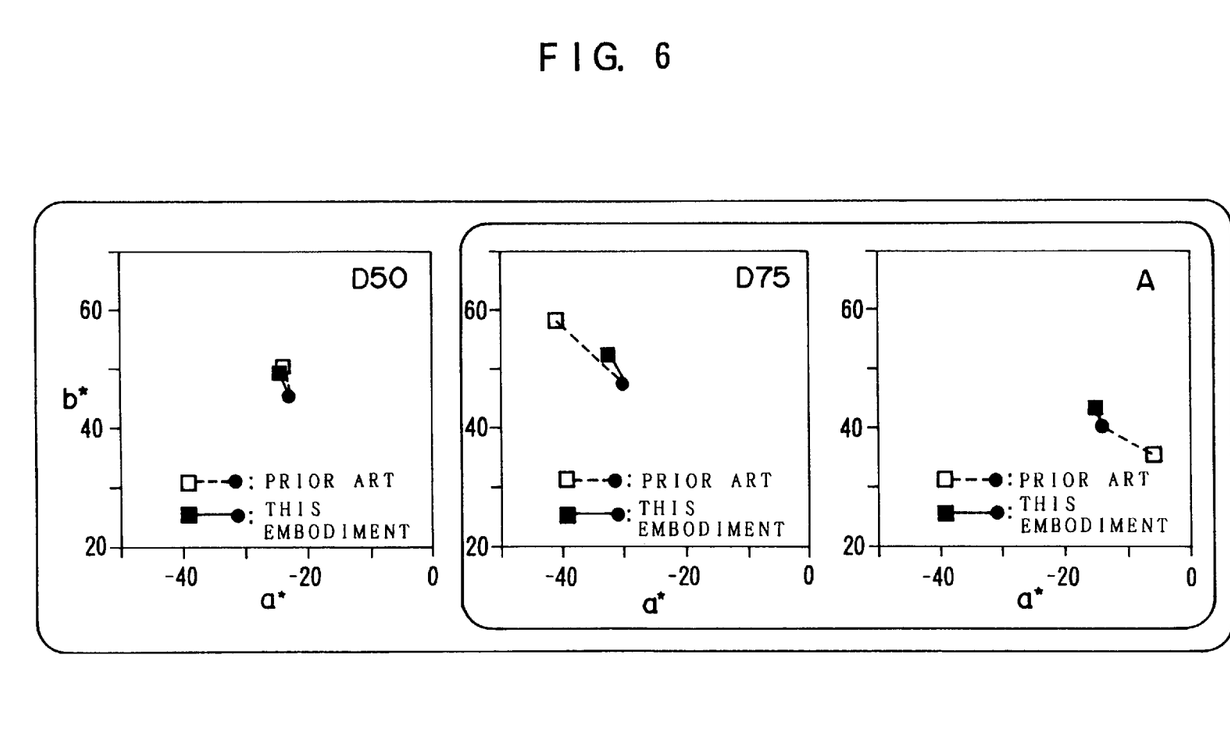
FIG. 6 is a diagram illustrating results of comparison by taking one color as an example between a conventional color imaging apparatus and the color imaging apparatus of this embodiment.
Figure 7A:
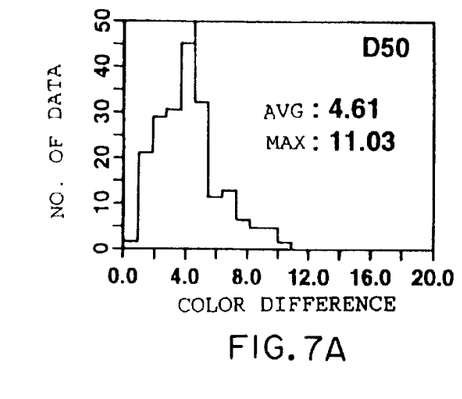
FIGS. 7A–7F show histograms illustrating results of comparison by using 216 colors between the conventional color imaging apparatus and the color imaging apparatus of this embodiment.
Figure 7B:
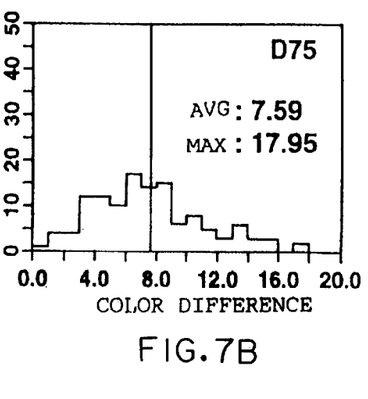
Figure 7C:
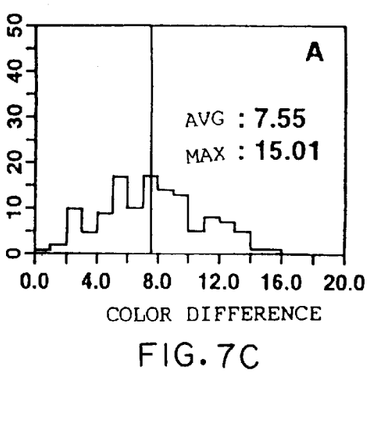
Figure 7D:
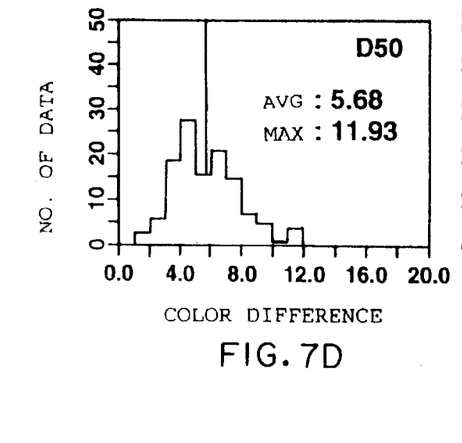
Figure 7E:
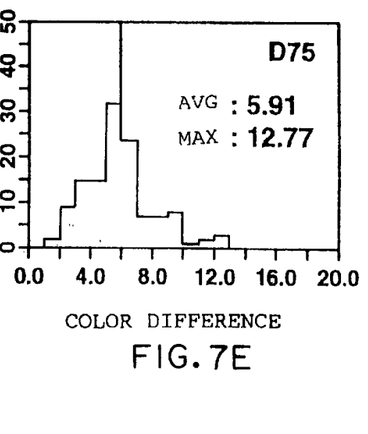
Figure 7F:
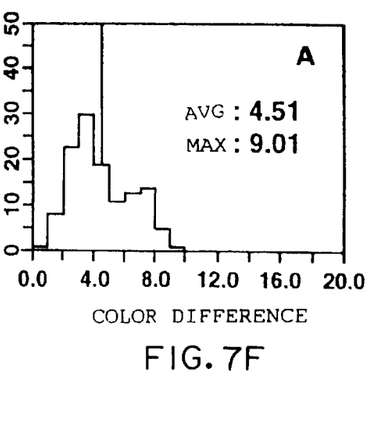

FIG. 6 shows the results of comparison of, on the one hand, the color difference between the color reproduced by using a conventional device-independent color imaging apparatus and an original color and, on the other, the color difference between the color reproduced by the color imaging apparatus of this embodiment and the original color. The thick solid black lines indicate the results for the color imaging apparatus of this embodiment, while the gray lines indicate the results for the conventional device-independent color imaging apparatus. As is apparent from these results, as compared to the conventional device-independent color imaging apparatus, the color imaging apparatus of this embodiment yields small values in terms of the variations in the color difference.

In FIG. 6, the color differences for the conventional color imaging apparatus and the color imaging apparatus of this embodiment under different illuminants are plotted on the a*b* plane of the CIE L*a*b* space by using one of 216 color chips. Here, the color difference is defined by the following formula:

$$\Delta E = \sqrt{\{(L_0^* - L_1^*)^2 + (a_0^* - a_1^*)^2 + (b_0^* - b_1^*)^2\}} \quad (8)$$

In addition, L*a*b* values are respectively defined by the following formulae:

$$L^* = 116\left(\frac{Y}{Y_0}\right)^{1/3} - 16$$

$$a^* = 500\left[\left(\frac{X}{X_0}\right)^{1/3} - \left(\frac{Y}{Y_0}\right)^{1/3}\right]$$

$$b^* = 200\left[\left(\frac{Y}{Y_0}\right)^{1/3} - \left(\frac{Z}{Z_0}\right)^{1/3}\right]$$

where $$X = \sum_{\lambda=380}^{780} S(\lambda)R(\lambda)\bar{x}(\lambda)d\lambda$$

$$Y = \sum_{\lambda=380}^{780} S(\lambda)R(\lambda)\bar{y}(\lambda)d\lambda$$

$$Z = \sum_{\lambda=380}^{780} S(\lambda)R(\lambda)\bar{z}(\lambda)d\lambda$$

where $S(\lambda)$: spectral distribution of an illuminant $\bar{x}(\lambda), \bar{y}(\lambda), \bar{z}(\lambda)$: color matching function Furthermore, FIGS. 7A–7F show histograms illustrating the results of comparison of color differences noted in all the color chips used in the evaluation with respect to the respective illuminants. Upper histograms in the drawing show the results for the conventional color imaging apparatus, while lower histograms show the results for the color imaging apparatus of this embodiment.

As is apparent from the results of FIGS. 6 and 7, the color imaging apparatus of this embodiment exhibits very small dependence on the illuminants as compared to the conventional color imaging apparatus, and its color differences between the reproduced colors and the original are maintained at a substantially fixed level even if the illuminant is changed. Thus, it can be appreciated that the color reproduction which is dependent on neither the device nor the illuminant can be realized with accuracy.

As described above, with the color imaging apparatus using characteristic parameters which are illuminant-independent, by using two neural networks having learning functions, it is possible to realize the transformation from output values from the device, such as RGB values and CMY and/or CMYK values, into characteristic parameters obtained by the principal component analysis of spectral reflectances, and it is possible to obtain a reproduced color corresponding to the subject original color in such a manner as to minimize the dependence on an illuminant, by using a linear transformation, such that colorimetric values of the subject and those of a reproduced color under a designated illuminant are to be equal, or such that a mean color difference value between a subject color and a reproduced color which is measured under the plurality of illuminants is minimized. Thus it is possible to realize color imaging using characteristic parameters which are illuminant-independent.

In accordance with the color reproduction method of the present invention described above, when color information values of the color reproduction devices are inputted, corresponding characteristic parameter values of an intermediate color representation system are outputted from the first neural network which has undergone learning. The characteristic parameter values are transformed under a constraint concerning the calorimetric values of a reproduced color between the first and second color reproduction devices by using eigenvectors and mean vectors obtained by multivariate analysis. The characteristic parameter values of this intermediate color representation system are outputted as corresponding color information values from the second neural network which has undergone learning. Therefore, there is an advantage in that, by using characteristic parameter values which are illuminant-independent and by making effective use of the learning functions of the neural networks, even if the color is represented by CMY and/or CMYK, or RGB values, it is possible to realize with sufficient accuracy the transformation between the color information values concerning such colors and characteristic parameters representing the spectral reflectance, thereby making it possible to effect color matching between different color reproduction devices.

In addition, in accordance with the color imaging apparatus of the present invention, the following are stored in advance in the storage means: eigenvectors and mean vectors of spectral reflectances of reproduced colors by the first and second color reproduction devices, which are obtained by the multivariate analysis of spectral reflectances in advance, connection weights of the two neural networks which have undergone learning in advance, the spectral distribution of at least one illuminant and the color matching function. Hence, there is an advantage in that even in cases where unknown data which were not used in learning are inputted, it is possible to speedily obtain optimum outputs with respect to input data by virtue of the versatile capabilities of the neural networks which have been made to undergo sufficient learning.

What is claimed is:

1. A color reproduction method for effecting color matching for a plurality of different color reproduction devices for reproducing the color of an original color image, comprising the steps of:

setting an intermediate color representation system which is represented by at least three characteristic parameter values obtained by multivariate analysis of a spectral reflectance or a spectral transmittance which is not dependent on an illuminant;

learning a first neural network such that, when at least three color information values peculiar to each of said color reproduction devices are inputted, said at least three characteristic parameter values of said intermediate color representation system corresponding to said inputted color information values are outputted, and learning a second neural network such that, when said at least three characteristic parameter values of said intermediate color representation system are inputted, color information values corresponding to said inputted characteristic parameter values are outputted;

transforming said at least three color information values peculiar to a first color reproduction device into said at least three characteristic parameter values of said intermediate color representation system by using said first neural network which has been learned;

transforming said at least three characteristic parameter values under a constraint concerning colorimetric values of colors reproduced by said first color reproduction device and a second color reproduction device different therefrom; and transforming said at least three characteristic parameter values transformed under the constraint, into color information values of said second color reproduction device by using said second neural network which has been learned, so as to effect color matching for said plurality of different color reproduction devices.

2. A color reproduction method according to claim 1, wherein said at least three color information values are values for representing three predetermined primary colors based on an additive mixture.

3. A color reproduction method according to claim 2, wherein said additive mixture uses R, G, and B values.

4. A color reproduction method according to claim 1, wherein said at least three color information values are values for representing each of predetermined colors based on a subtractive mixture.

5. A color reproduction method according to claim 4, wherein said subtractive mixture uses C, M, and Y values or C, M, Y, and K values.

6. A color reproduction method according to claim 1, wherein principal component analysis is used as said multivariate analysis, and a color system which is represented by principal component values of the spectral reflectance obtained by said principal component analysis is used as said intermediate color representation system.

7. A color reproduction method according to claim 1, wherein each of said neural networks is a multilayered feedforward neural network with three to five layers having a learning function.

8. A color reproduction method according to claim 1, wherein said constraint has a condition that colorimetric values of a subject and those of a reproduced color under a designated illuminant are equal, or that a mean color difference value between a subject color and a reproduced color measured under a plurality of designated illuminants is minimized.

9. A color reproduction method according to claim 1, wherein any one of an illuminant A, an illuminant B, an illuminant C, an illuminant D, and illuminants F1 to F12 which are specified by CIE (Commission Internationale de l'Eclairage) or an illuminant having a spectral distribution equivalent thereto is used as said illuminant used in the transformation into said color information values for said second color reproduction device.

10. The method of claim 1, wherein the step of transforming said at least three transformed parameter values is performed by using eigenvectors and a mean vector of said spectral reflectance or said spectral transmittance which are obtained by said multivariate analysis.

11. A color imaging apparatus for effecting color matching for a plurality of different color reproduction devices for reproducing the color of an original color image, said color imaging apparatus comprising:

input means for converting at least three color information values into electrical signals;

storage means for storing eigenvectors and mean vectors of spectral reflectances of reproduced colors by a first color reproduction device and a second color reproduction device which are obtained by performing the multivariate analysis of spectral reflectances in advance, connection weights of two neural networks which have been learned in advance, a spectral distribution of at least one illuminant, and color matching functions;

first transforming means adapted to transform the electrical signals from said input means into electrical signals corresponding to characteristic parameter values;

second transforming means for transforming the electrical signals from said first transforming means by a linear transformation having a condition that colorimetric values of a subject color and those of a reproduced color under a designated illuminant are equal, or that a mean color difference value between a subject color and a reproduced color measured under a plurality of designated illuminants is minimized;

third transforming means adapted to transform characteristic parameter values of said second color reproduction device outputted from said second transforming means into electrical signals corresponding to color information values of said second color reproduction device; and output means for outputting as output signals the electrical signals outputted from said third transforming means.

12. The apparatus of claim 11, wherein said first transforming means comprises a multilayered feedforward neural network with a learning function which has learned the transformation of said at least three color information values into principal components of a spectral reflectance of a reproduced color corresponding to a set of color separation values of said at least three color information values.

13. The apparatus of claim 11, wherein said characteristic parameter values are obtained by the multivariate analysis of spectral reflectances or spectral transmittances of a reproduced color corresponding to said at least three color information values.

14. The apparatus of claim 11, wherein said second transforming means is a means for transforming by using said eigenvectors and mean vectors of said spectral reflectances of said reproduced colors by said first color reproduction device and said second color reproduction device which are stored in advance in said storage means.

15. The apparatus of claim 11, wherein said third transforming means comprises a multilayered feedforward neural network with a learning function which has learned the transformation of principal components of a spectral reflectance of a reproduced color into color information values.

* * * * *